(12) United States Patent
DeMichele et al.

(10) Patent No.: US 11,326,554 B2
(45) Date of Patent: May 10, 2022

(54) HYDRAULIC BAULKING SYNC LOCK (71) Applicant: Woodward, Inc., Fort Collins, CO (US)

(72) Inventors: Dan DeMichele, Glendora, CA (US);
Neil Jenkins, Valencia, CA (US);
Joseph Thomas Kopecek, Santa Clarita, CA (US)

(73) Assignee: Woodward, Inc., Fort Collins, CO (US)

( * ) Notice: Subject to any disclaimer, the term of this patent is extended or adjusted under 35 U.S.C. 154(b) by 102 days.

(21) Appl. No.: 16/919,854

(22) Filed: Jul. 2, 2020

(65) Prior Publication Data
US 2022/0003187 A1 Jan. 6, 2022

(51) Int. Cl.
*F15B 15/26* (2006.01)
*F02K 1/76* (2006.01)
*F15B 15/14* (2006.01)

(52) U.S. Cl.
CPC .......... *F02K 1/766* (2013.01); *F15B 15/261* (2013.01); *F15B 15/264* (2013.01); *F15B 2015/1495* (2013.01)

(58) Field of Classification Search
CPC ....... F15B 15/261; F15B 15/264; F02K 1/766
See application file for complete search history.

(56) References Cited

U.S. PATENT DOCUMENTS

| 5,048,656 | A | * | 9/1991 | Braun | ..................... B60T 17/16 |
| | | | | | 192/85.57 |
| 5,448,884 | A | | 9/1995 | Repp et al. | |
| 5,609,020 | A | * | 3/1997 | Jackson | ..................... F02K 1/76 |
| | | | | | 244/110 B |
| 6,487,846 | B1 | | 12/2002 | Chakkera et al. | |

FOREIGN PATENT DOCUMENTS

EP 0743443 11/1996

OTHER PUBLICATIONS

PCT International Search Report and Written Opinion in International Appln. No. PCT/US2021/039943, dated Oct. 11, 2021, 12 pages.

\* cited by examiner

*Primary Examiner* — F Daniel Lopez
(74) *Attorney, Agent, or Firm* — Fish & Richardson P.C.

(57) ABSTRACT

The subject matter of this specification can be embodied in, among other things, a thrust reverser synchronization shaft lock system includes a rotatable shaft comprising at least one radial prong extending radially from the shaft, a hydraulic lock assembly that includes a housing, a piston head having a lock recess, a piston rod extending radially away from the shaft and configured to be urged by the piston head to move the first piston rod end out of engagement with the radial prong to selectably permit rotation of the shaft, and a bias member configured to urge the first piston rod end into engagement with the radial prong, and an electric lock assembly that includes a lock pin and an electric actuator configured to controllably extend and retract the lock pin in and out of engagement with the lock recess.

17 Claims, 11 Drawing Sheets

HYDRAULIC BAULKING SYNC LOCK

TECHNICAL FIELD

This instant specification relates to an aircraft thrust reverser actuation locking system.

BACKGROUND

Contemporary aircraft engines may include a thrust reverser actuation system to assist in reducing the aircraft speed during landing. Typical thrust reversers include a movable transcowl that, when in the active position, reverses at least a portion of the airflow passing through the engine.

Accidental or inadvertent activation and deployment of thrust reversers at inappropriate times can be dangerous or deadly. Accidental deployment on the ground while ground crews are performing service on the engine can result in injury or death. Accidental activation during flight can cause a catastrophic loss of airspeed or failure of the airframe. Mechanical malfunctions, such as a loss of hydraulic pressure, can also allow a reverser to move out of the stowed position at an inappropriate time.

To prevent accidental or unintentional thrust reverser deployment, locking mechanisms are used. Before the thrust reverser can be moved from its stowed position, the lock must first be disengaged. Some current reverser lock designs implement rotating jaws to engage a probe. Such designs can be heavy and mechanically complex, which adds weight and maintenance requirements to the aircraft on which they are installed. Some current reverser lock designs implement hydraulically actuated elements that require additional hydraulic control lines that are no longer provided in some newer aircraft designs, and therefore such locks cannot be used with such aircraft.

SUMMARY

In general, this document describes an aircraft thrust reverser actuation locking system.

In an example aspect, a thrust reverser synchronization shaft lock system includes a rotatable shaft comprising at least one radial prong extending radially from the shaft, a hydraulic lock assembly that includes a housing having a tubular inner wall defining a chamber, a piston head configured to contact the tubular inner wall and having a first piston face on a first longitudinal side of the piston head, a second piston face on a second longitudinal side of the piston head opposite the first piston face, and a lock recess, and configured to divide the chamber into a first fluid chamber defined by the tubular inner wall and the first piston face, and a second fluid chamber defined by the tubular inner wall and the second piston face, a piston rod, extending radially away from the shaft from a first piston rod end to a second piston rod end opposite the first piston rod end, and configured to be urged by the piston head to move the first piston rod end out of engagement with the radial prong to selectably permit rotation of the shaft, and a bias member configured to urge the first piston rod end into engagement with the radial prong to selectably prohibit rotation of the shaft, and an electric lock assembly that includes a lock pin, and an electric actuator configured to controllably extend and retract the lock pin in and out of engagement with the lock recess to selectably prohibit and permit movement of the piston rod.

Various embodiments can include some, all, or none of the following features. The tubular inner wall can include a first longitudinal wall portion configured to define the first fluid chamber to have a first lateral cross-sectional area proximal to the first piston rod end, and a second longitudinal wall portion configured to define the second fluid chamber to have a second lateral cross-sectional area that is smaller than the first lateral cross-sectional area distal from the first piston rod end, and the piston head can include a first piston head portion, sized to contact the tubular inner wall such that the first piston face has substantially the first lateral cross-sectional area, and a second piston head portion, sized to contact the tubular inner wall such that the second piston face has substantially the second lateral cross-sectional area. The thrust reverser synchronization shaft lock system can also include a third fluid chamber configured to be in fluid communication with atmospheric gases at ambient pressure or with hydraulic return pressure, and defined by the first longitudinal wall portion and the second piston head portion. The first fluid chamber can be configured to be in fluid communication with a thrust reverser stowage fluid pressure source, and the second fluid chamber can be configured to be in fluid communication with the thrust reverser stowage fluid pressure source. The thrust reverser synchronization shaft lock system can also include a shaft housing disposed about the shaft and defining a shaft fluid chamber configured to be in fluid communication with a thrust reverser deployment fluid source. The thrust reverser synchronization shaft lock system can also include a fluid conduit configured to fluidically connect the first fluid chamber and the second fluid chamber. The fluid conduit can be a tubular conduit defined through the piston rod. The thrust reverser synchronization shaft lock system can also include a pivotable cam configured to engage a cam recess defined in the piston head and pivot to urge longitudinal movement of the piston head and disengage the first piston rod end from the radial prong. The thrust reverser synchronization shaft lock system can also include a drive assembly configured to removably couple torque from a removable rotary power source to the shaft.

In another example aspect, a method of thrust reverser synchronization shaft locking includes removing or equalizing a hydraulic stowage fluid pressure in a first fluid chamber, wherein a hydraulic lock assembly includes a housing, a piston head, a piston rod coupled to the piston head, the first fluid chamber in the housing at a first longitudinal end of the piston head, and a second fluid chamber in the housing at a second longitudinal end of the piston head opposite the first longitudinal end, urging, by a bias member, longitudinal movement of the piston rod in a first direction, the piston rod having a first piston rod end and a second piston rod end opposite the first piston rod end, urging, by longitudinal movement of the piston rod in the first direction, the first piston rod end into engagement with a radial prong extending radially from a rotatable shaft, de-energizing an electric lock assembly, and extending, based on the de-energizing an electric lock assembly, a lock pin into engagement with a recess defined in the piston head.

Various implementations can include some, all, or none of the following features. The method can also include prohibiting, by engagement of the lock pin with the recess, disengagement of the first piston rod end from the radial prong. The method can also include prohibiting, by engagement of the first piston rod end with the radial prong, rotation of the shaft. The method can also include energizing the electric lock assembly, retracting, based on the energizing, the lock pin from engagement with the recess, applying the hydraulic stowage fluid pressure to the first fluid chamber, urging, by the hydraulic stowage fluid pressure in the first fluid chamber, longitudinal movement of the piston head in a second direction opposite the first direction, urging, by longitudinal movement of the piston head in the second direction, longitudinal movement of the piston rod in the second direction, and urging, by longitudinal movement of the piston rod in the second direction, the first piston rod end out of engagement with the radial prong. The method can also include applying the hydraulic stowage fluid pressure to the second fluid chamber, wherein a first piston face of the piston head has a first lateral cross-sectional area, applying a first hydraulic force, based on the first lateral cross-sectional area, to the piston head in the first direction, applying the hydraulic stowage fluid pressure to the first fluid chamber, wherein a second piston face of the piston head has a second lateral cross-sectional area that is larger than the first lateral cross-sectional area, and applying a second hydraulic force, based on the second lateral cross-sectional area, to the piston head in the second direction, wherein the second lateral cross-sectional area is configured such that the second hydraulic force is greater than the first hydraulic force and a bias force of the bias member. Removing or equalizing a hydraulic stowage fluid pressure in a first fluid chamber can include removing the hydraulic stowage fluid pressure from a first piston face on a first longitudinal side of the piston head, the first piston face defining the first fluid chamber in fluid communication with a thrust reverser stowage fluid pressure source of a jet engine thrust reverser system, and removing the hydraulic stowage fluid pressure from a second piston face on a second longitudinal side of the piston head opposite the first piston face, the second piston face defining the second fluid chamber in fluid communication with the thrust reverser stowage fluid pressure source of the jet engine thrust reverser system. The method can also include urging rotation of a pivotable cam engaged with a cam recess defined in the piston rod, urging, based on the rotation, longitudinal movement of the piston rod in a second longitudinal direction opposite the first longitudinal direction, and disengaging, based on the longitudinal movement of the piston rod in the second longitudinal direction, the first piston rod end from the radial prong. The method can also include coupling a removable rotational power source to an input of a drive assembly, urging, by the removable rotational power source, rotation of the input, and urging, by the drive assembly, rotation of the shaft based on the rotation of the input.

The systems and techniques described here may provide one or more of the following advantages. First, the system replaces a conventional two-piece, jaws-type lock mechanism with a much simpler rotary-type design. Second, the system uses a rotary mechanism that is smaller and less complex than the large and heavy moving jaws of jaws-type lock mechanism designs. Third, the system uses a one moving piece mechanism instead of the complex slot and bearing mechanism that is used to swing the jaws of a jaws-type lock. Fourth, the system is lighter and more reliable than jaws-type lock mechanism.

The details of one or more implementations are set forth in the accompanying drawings and the description below. Other features and advantages will be apparent from the description and drawings, and from the claims.

DETAILED DESCRIPTION

This document describes systems and techniques for reversing aircraft turbine engine airflow. A thrust reverser with at least one movable element, which is movable to and from a reversing position, may be used to change the direction of the bypass airflow. In the reversing position, the movable element may be configured to reverse at least a portion of the bypass airflow.

Locking mechanisms engage the thrust reversers to prevent accidental activation or accidental deployment (e.g., during flight, during ground maintenance operations). The paragraphs below describe a mechanism that provides such locking in an assembly that is relatively lighter and less complex than existing designs, and does not use a dedicated hydraulic line for locking, as some existing designs require.

Figure 1:
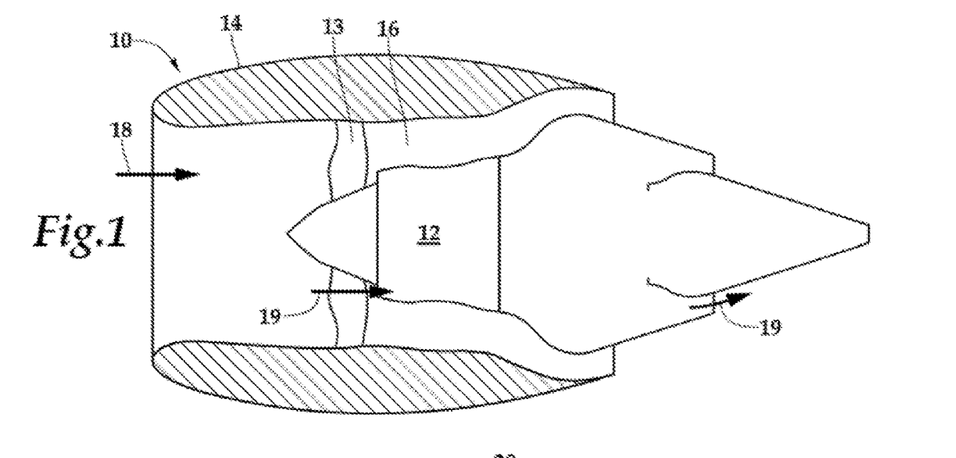
FIG. 1 is a schematic view of an example turbofan jet engine assembly with a portion of the outer nacelle cut away for clarity.

FIG. 1 illustrates an example turbofan jet engine assembly 10 having a turbine engine 12, a fan assembly 13, and a nacelle 14. Portions of the nacelle 14 have been cut away for clarity. The nacelle 14 surrounds the turbine engine 12 and defines an annular airflow path or annular bypass duct 16 through the jet engine assembly 10 to define a generally forward-to-aft bypass airflow path, as schematically illustrated by the arrow 18. A combustion airflow is schematically illustrated by the arrows 19.

Figure 2:
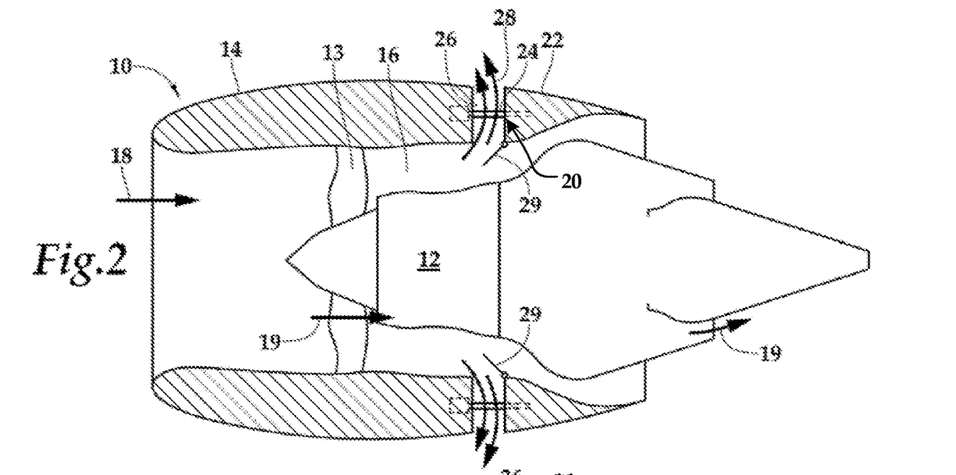
FIG. 2 is a schematic view of the example engine assembly of FIG. 1 with an exemplary thrust reverser.

A thrust reverser with at least one movable element, which is movable to and from a reversing position, may be used to change the direction of the bypass airflow. In the reversing position, the movable element may be configured to reverse at least a portion of the bypass airflow. There are several methods of obtaining reverse thrust on turbofan jet engine assemblies. FIG. 2 schematically illustrates one example of a thrust reverser 20 that may be used in the turbofan jet engine assembly 10. The thrust reverser 20 includes a movable element 22. The movable element 22 has been illustrated as a cowl portion that is capable of axial motion with respect to the forward portion of the nacelle 14. A hydraulic actuator 24 may be coupled to the movable element 22 to move the movable element 22 into and out of the reversing position. In the reversing position, as illustrated, the movable element 22 limits the annular bypass area between the movable element 22 and the turbine engine 12, it also opens up a portion 26 between the movable element 22 and the forward portion of the nacelle 14 such that the air flow path may be reversed as illustrated by the arrows 28. An optional deflector or flap 29 may be included to aid in directing the airflow path between the movable element 22 and the forward portion of the nacelle 14.

Figure 3:
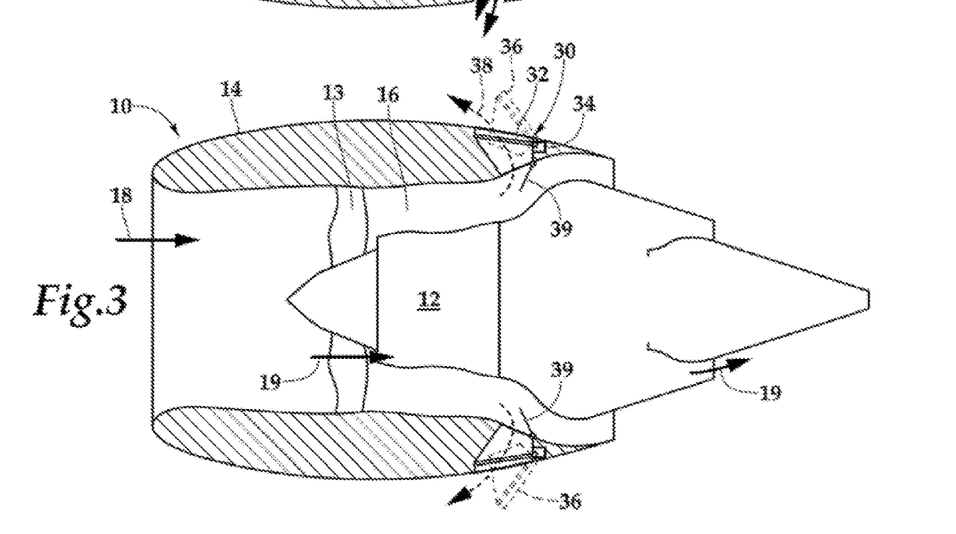
FIG. 3 is a schematic view of the example engine assembly of FIG. 1 with an alternative exemplary thrust reverser.

FIG. 3 schematically illustrates an alternative example of a thrust reverser 30. The thrust reverser 30 includes a movable element 32. The movable element 32 has been illustrated as a deflector, which may be built into a portion of the nacelle 14. A hydraulic actuator 34 may be coupled to the movable element 32 to move the movable element 32 into and out of the reversing position. In the reversing position, shown in phantom and indicated at 36, the movable element 32 turns that air outward and forward to reverse its direction as illustrated by the arrows 38. An optional deflector or flap 39 may be included to aid in directing the airflow path outward.

In both illustrative examples, the thrust reverser changes the direction of the thrust force. Both the thrust reverser 20 and the thrust reverser 30 have been described as hydraulically operated systems and a hydraulic actuator has been schematically illustrated. In some embodiments, the thrust reverser 20 and/or the thrust reverser 30 can be powered by other fluids (e.g., pneumatic), by electro-mechanical actuators, or by any other appropriate power source or actuator type.

Figure 4:
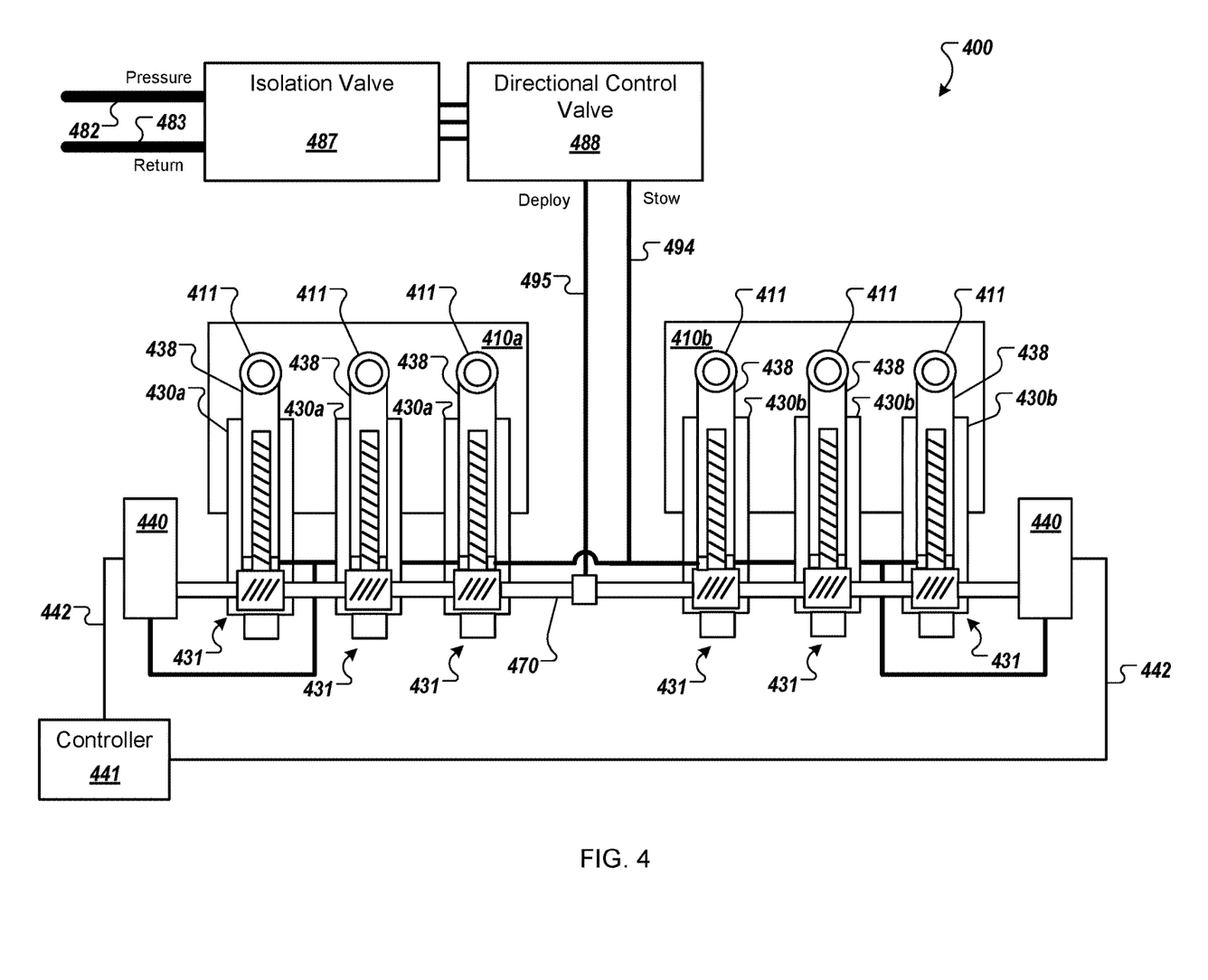
FIG. 4 is a schematic view of an example thrust reverser system.

FIG. 4 is a schematic view of an example thrust reverser system 400. In some embodiments, the thrust reverser system 400 can include some or all of the example thrust reverser 20 of FIG. 2 and/or the example thrust reverser 30 of FIG. 3. In some embodiments, the example turbofan jet engine assembly 10 of FIGS. 1-3 can include the example thrust reverser system 400.

A moveable transcowl portion 410a is affixed to rod ends 411 of a collection of synchronized actuators 430a. A moveable transcowl portion 410b is affixed to the rod ends 411 of a collection of synchronized actuators 430b. In the illustrated example, the moveable transcowl portions 410a and 410b are shown as being flat (e.g., planar) only for ease of viewing. In their intended form, the moveable transcowl portions 410a and 410b both have a semi-tubular (e.g., half-cylinder) shape, such that when brought together in a closed configuration the moveable transcowl portions 410a and 410b form a generally tubular, cylindrical, or conic section that can surround a portion of a turbine engine. For example, the moveable transcowl portions 410a and 410b can be the example movable element 22 or the moveable element 32.

The moveable transcowl portion 410a is affixed to an aircraft wing, fuselage, or other structural member. The moveable transcowl portion 410b is also affixed to an aircraft wing, fuselage, or other structural member.

The synchronized actuators 430a and 430b each have a proximal end 431 affixed to the nacelle or other substantially stationary portion of the engine, and a moveable end 438 (e.g., a piston rod end) that is directly or indirectly coupled to one or both of the moveable transcowl portions 410a or 410b at their respective rod ends 411. A mechanical synchronization system 470 (e.g., a cable or shaft interlink) interconnects the synchronized actuators 430a-430b to transmit lock loads between opposite sides of the thrust reverser system 400. The mechanical synchronization system 470 provides multiple functions. In the illustrated example, the mechanical synchronization system 470 also provides a fluid conduit that carries pressurized fluid to the synchronized actuators 430a-430b (e.g., a cable or shaft that runs through the interior of a fluid conduit, a fluid conduit in which the housing can transmit mechanical torque and also allows fluid to flow through its interior). The synchronized actuators 430a are configured to provide actuation primarily to the moveable transcowl portion 410a. The synchronized actuators 430b are configured to provide actuation primarily to the moveable transcowl portion 410b.

The moveable transcowl portions 410a and 410b are operated by controllably directing pressurized fluid (e.g., hydraulic fluid) from a fluid supply line 482, through an isolation valve 487, to the synchronized actuators 430a-430b, and back to a fluid return line 483. Pressurized fluid is provided to a directional control valve 488. The directional control valve 488 is a hydraulic valve that is operable to direct fluid flows to the synchronized actuators 430a-430b to actuate the synchronized actuators 430a-430b and urge movement of the moveable transcowl portions 410a and 410b between a stowed configuration and a deployed configuration. For example, in one configuration of the directional control valve 488, pressurized fluid can be directed to flow to the synchronized actuators 430a-430b through a fluid conduit 495 and return through a fluid conduit 494 in order to deploy the moveable transcowl portions 410a and 410b, and in another configuration of the directional control valve 488, pressurized fluid can be directed to flow to the synchronized actuators 430a-430b through a fluid conduit 494 and return through a fluid conduit 495 in order to stow the moveable transcowl portions 410a and 410b.

In some embodiments, the directional control valve 488 can be a regenerative type valve. For example, in a regenerative valve, pressure can be applied simultaneously to the deploy line 495 and to the stow line 494 in order to deploy the actuators 430a-430b.

While the illustrated example has been described in terms of deployment, the thrust reverser system 400 can be operated in a stow mode. For example, the directional control valve 488 can be configured to flow pressurized fluid out through the fluid conduit 494 and receive returned fluid through the fluid conduit 495 to cause the synchronized actuators 430a-430b to retract the moveable transcowl portions 410a and 410b.

The system 400 includes a pair of thrust reverser synchronization shaft lock systems 440. The thrust reverser synchronization shaft lock systems 440 are each coupled to ends of the mechanical synchronization system 470 (e.g., coupled to the rotational motion provided by the synchronization shaft). The thrust reverser synchronization shaft lock systems 440 are configured to selectively allow intentional rotation and prevent unintentional rotation of the synchronization system 470, and thereby selectively allow intentional movement and prevent unintentional movement of the moveable transcowl portions 410a and 410b based on fluid pressures provided by the fluid conduits 494 and 495, and an electrical signal provided by a controller 441 over a collection of electrical signal lines 442. The configuration and operation of the thrust reverser synchronization shaft lock systems 440 will be discussed further in the descriptions of FIGS. 5A-9.

Figure 5A:
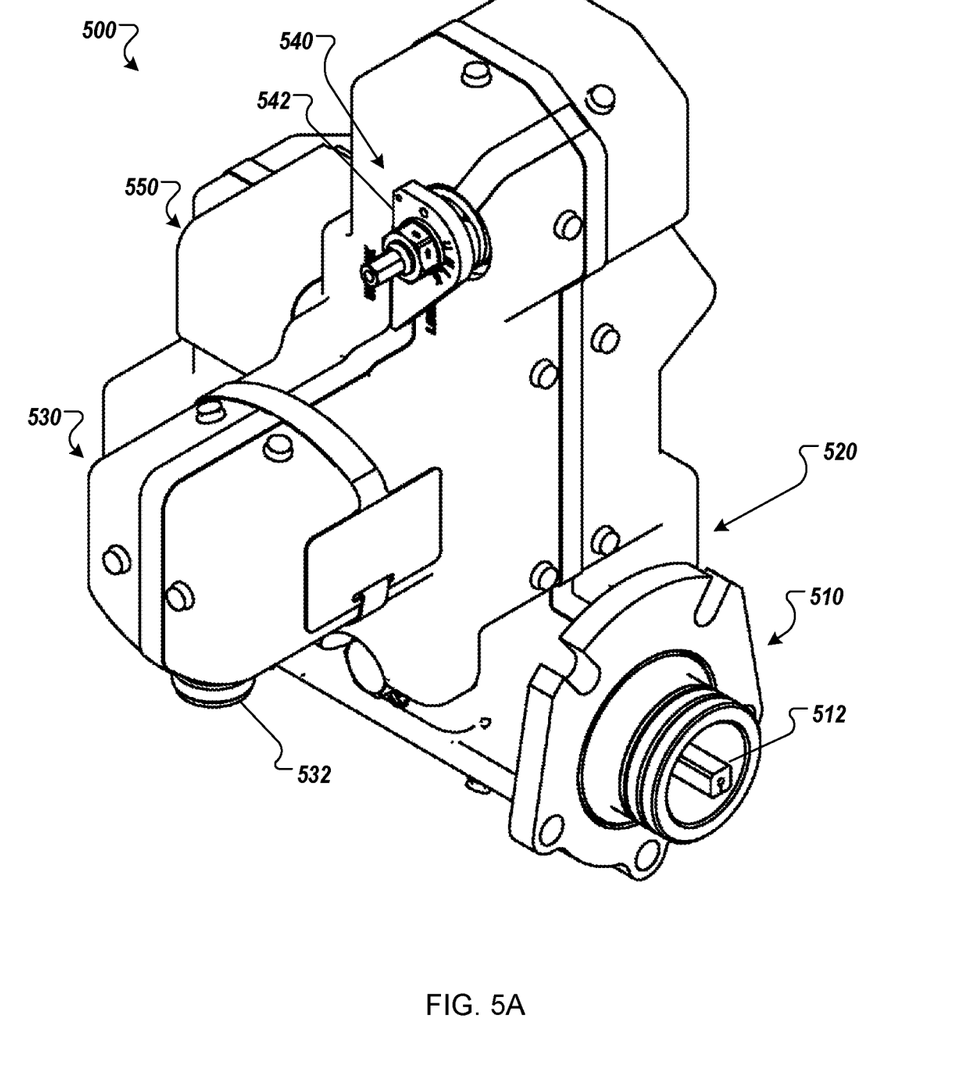
FIGS. 5A and 5B are isometric views of an example thrust reverser synchronization shaft lock system.
Figure 5B:
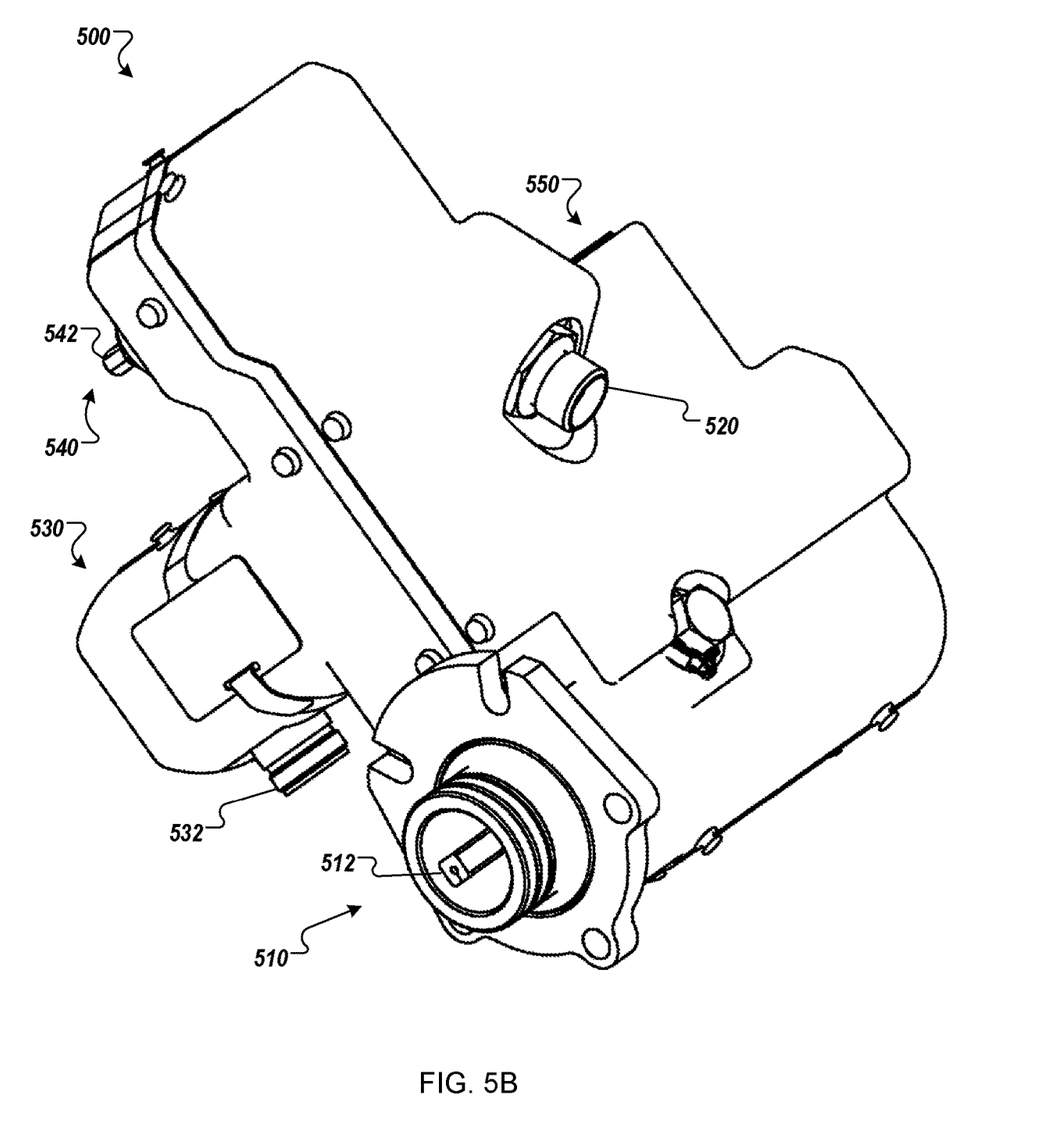

FIGS. 5A and 5B are isometric views of an example thrust reverser synchronization shaft lock system 500. In some implementations, the thrust reverser synchronization shaft lock system 500 can be the example thrust reverser synchronization shaft lock system 440 of FIG. 4. The thrust reverser synchronization shaft lock system 500 includes a synchronization system interface 510 configured to be fluidically coupled to a thrust reverser deployment fluid pressure source (e.g., pressure provided by the example fluid conduit 495 through the example synchronization system 470) and having a synchronization shaft input 512 configured to be rotatably coupled to a synchronization shaft (e.g., of the example synchronization system 470). The thrust reverser synchronization shaft lock system 500 includes a fluid port 520 that is configured to be fluidically coupled to a thrust reverser stowage fluid pressure source (e.g., such as fluid pressure provided by the example fluid conduit 495). The thrust reverser synchronization shaft lock system 500 includes an electrical lock assembly 530 having an electrical input port 532 configured to electrically connect to an electrical activation signal (e.g., from the controller 441 over the electrical signal line 442). The thrust reverser synchronization shaft lock system 500 includes a manual unlock assembly 540 having a manual input 542. The thrust reverser synchronization shaft lock system 500 also includes a manual drive assembly 550. These components of the thrust reverser synchronization shaft lock system 500 will be discussed in more detail in the descriptions of FIG. 6A-9.

Figure 6A:
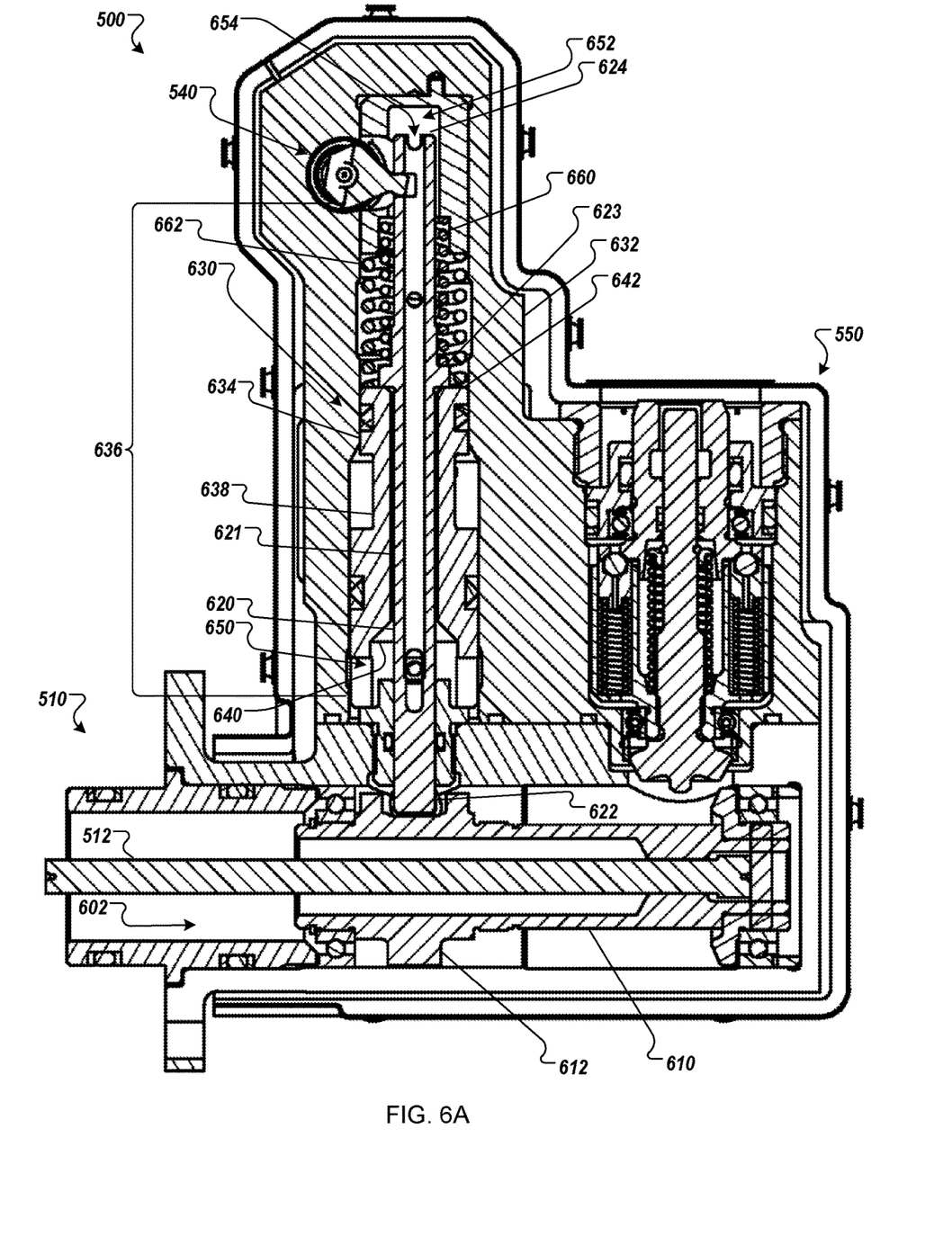
FIGS. 6A-6C are sectional views of the example thrust reverser synchronization shaft lock system of FIGS. 5A and 5B in a locked configuration.
Figure 6B:
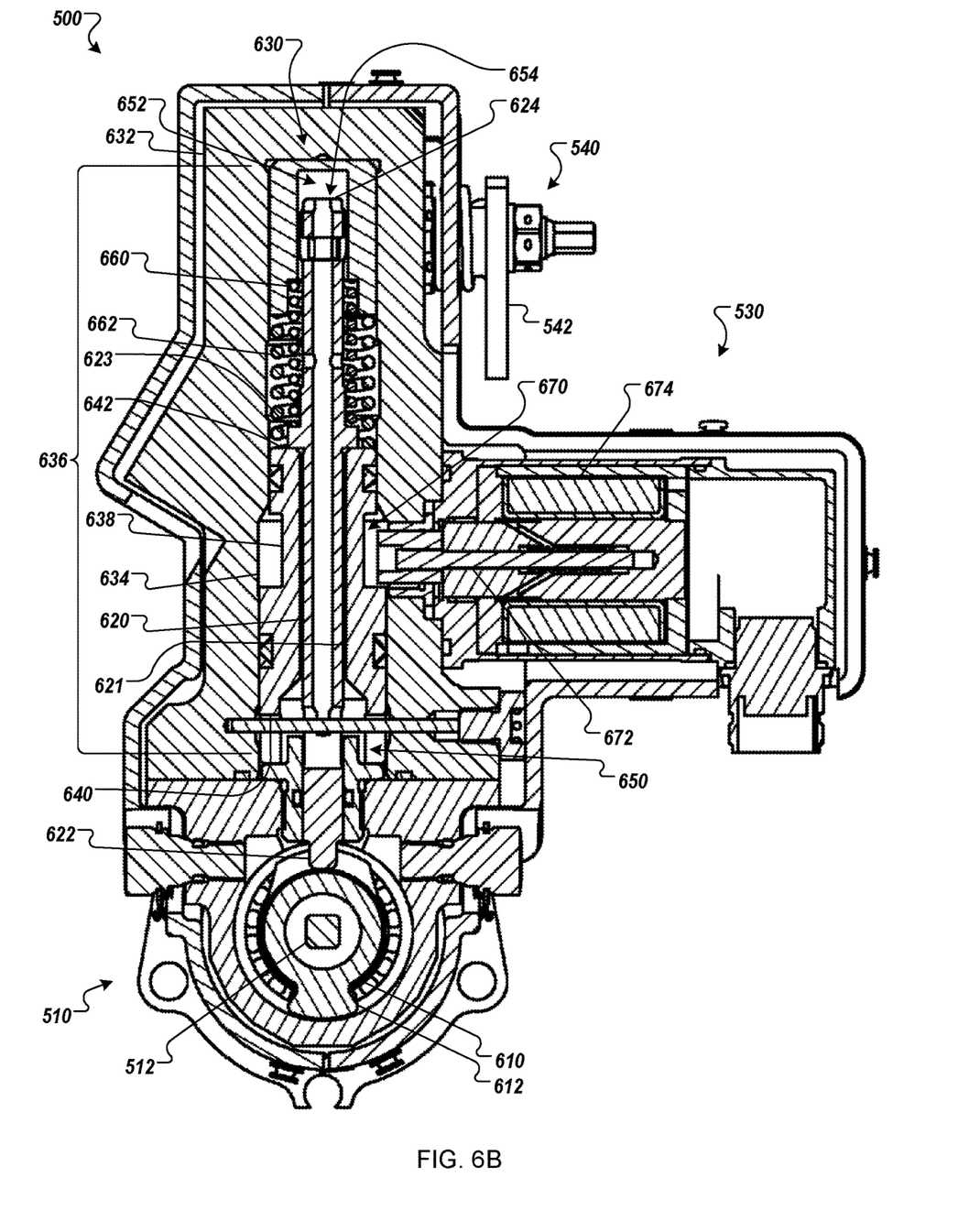
Figure 6C:
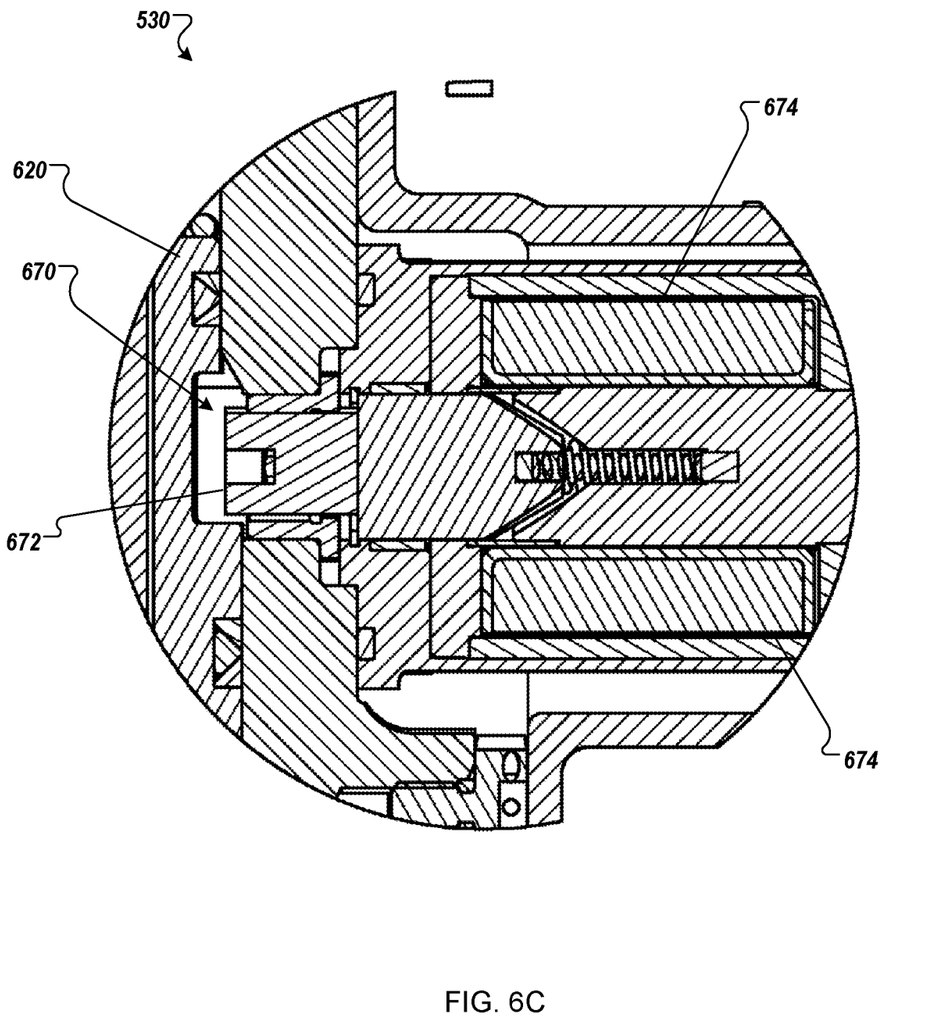

FIGS. 6A-6C are sectional views of the example thrust reverser synchronization shaft lock system 500 of FIGS. 5A and 5B in a locked configuration. The mechanical synchronization system 470 of FIG. 4 is coupled to the synchronization system interface 510 through the synchronization shaft input 512. When the mechanical synchronization system 470 is coupled to the synchronization system interface 510, a shaft fluid chamber 602 is defined. The synchronization shaft input 512 is coupled to a shaft 610, and rotation of the mechanical synchronization system 470 urges rotation of the shaft 610. The shaft 610 includes a radial prong 612 that extends radially away from the shaft 610. In some embodiments, multiple radial prongs such as the radial prong 612 can extend radially away from the shaft 610.

As the shaft rotates, the radial prong 612 rotates into contact with a rod end 622 of a piston rod 620 that is in a locked configuration. Mechanical interference between the first rod end 622 and the radial prong 612 prevents further rotation of the shaft 610, which in turn prevents further rotation of the mechanical synchronization system 470. In the illustrated example, rotation of the mechanical synchronization system 470 is limited to less than one turn in the locked configuration. The gear ratios of the synchronized actuators 430a and 430b are configured such that a single turn, or less, of the mechanical synchronization system 470 will not cause a substantial movement of the moveable transcowl portions 410a and 410b, substantially locking the moveable transcowl portions 410a and 410b in place and substantially preventing inadvertent deployment of the thrust reverser 400.

The piston rod 620 is moved into and out of the locked configuration by a hydraulic lock assembly 630. The hydraulic lock assembly 630 includes a housing 632 having a tubular inner wall 634 defining a chamber 636. A piston head 638 is configured to contact the tubular inner wall 634 and has a first piston face 640 on a first longitudinal side of the piston head 638, and a second piston face 642 on a second longitudinal side of the piston head 638 opposite the first piston face 640.

The piston rod 620 extends through a cavity 621 defined through the piston head 638, and is configured to move radially within the cavity 621. The piston rod 620 extends radially away from the shaft 610 from the first piston rod end 622 to a second piston rod end 624 opposite the first piston rod end 622. The piston rod 620 includes a stop 623 that is configured to contact the second piston face 642. As the piston head 638 moves radially away from the shaft 610, the second piston face 642 contacts the stop 623 and urges radially outward movement of the piston rod 620 as well. The piston rod 620 is configured to be urged by contact between the stop 623 and the piston head 638 to move the first piston rod end 622 out of engagement with the radial prong 612 to selectably permit rotation of the shaft 610, as will be discussed in more detail in the descriptions of FIGS. 7A and 7B.

A bias member 660 (e.g., a spring) is configured to urge the stop 623 into engagement with the piston head 638, and a bias member 662 is configured to urge the piston head 638 in the direction of the shaft 610. The actions of the bias members 660 and 662 combine to urge the first piston rod end 622 into the locked configuration where the first piston rod end 622 can contact and interfere with movement of the radial prong 612 to selectably prohibit rotation of the shaft 610.

Referring to FIGS. 6B and 6C, the electric lock assembly 530 includes a lock pin 672 and an electric actuator 674 that is configured to controllably extend and retract the lock pin 672 in and out of engagement with a lock recess 670 defined in the piston head 638. The lock recess 670 is configured to receive a portion of lock pin 672. In some embodiments, the electric lock assembly 530 can be an electric solenoid or any other appropriate form of electrical actuator. The electric lock assembly 530 is configured to urge the lock pin 672 toward extension by default, and retract the lock pin 672 in response to an electrical control signal.

When the lock pin 672 is urged toward extension, the lock pin 672 will abut the piston head 638 until the lock recess 670 comes into alignment with the lock pin 672. Once aligned, the lock pin 672 will extend into the lock recess 670 and prohibit longitudinal movement the piston head 638, which prevents movement of piston head 638 when urged by hydraulic pressure which prohibits disengagement of the first piston rod end 622 from the radial prong 612, which prevents rotation of the shaft 610.

Figure 7A:
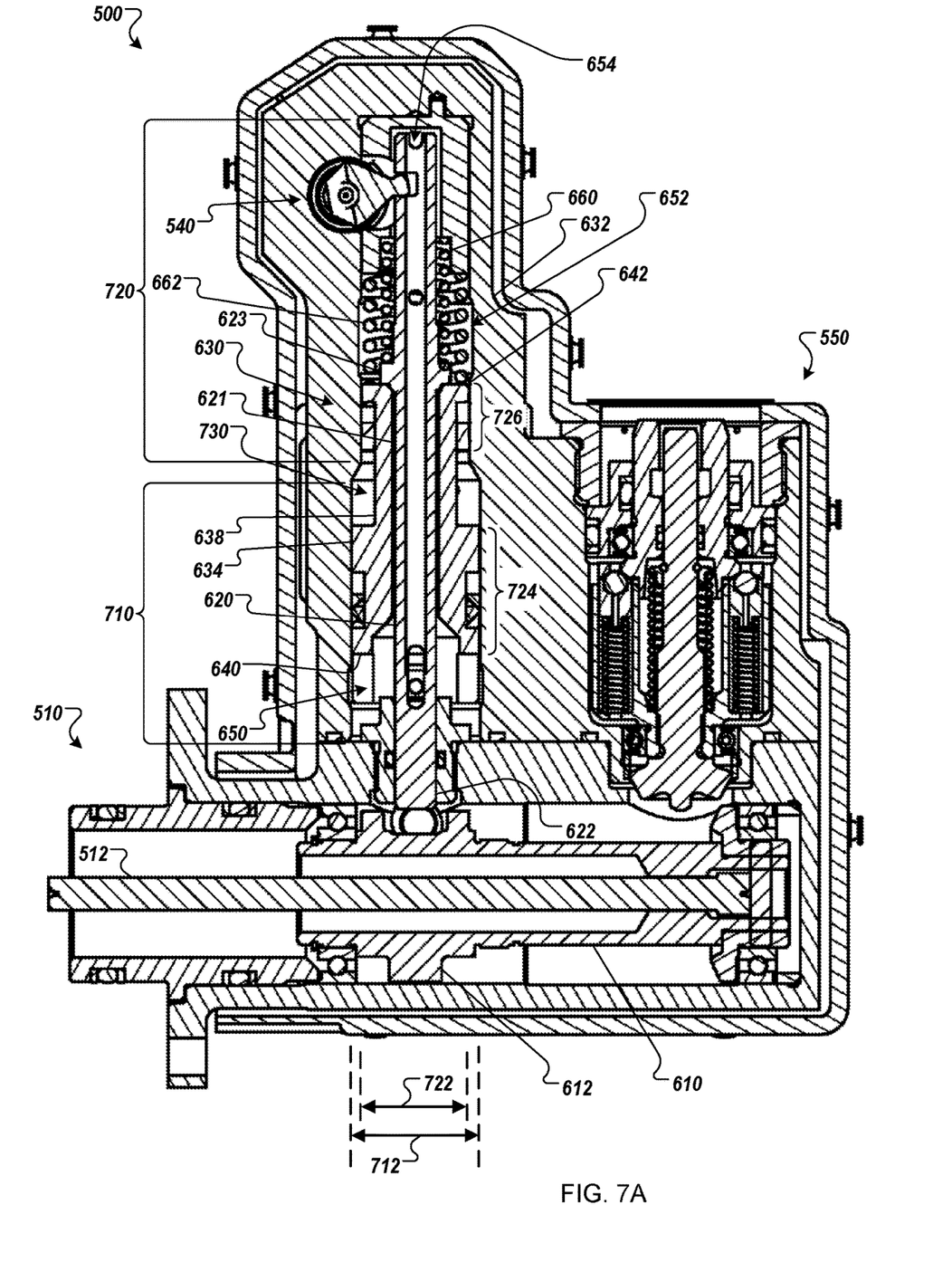
FIGS. 7A and 7B are sectional views of the example thrust reverser synchronization shaft lock system of FIGS. 5A and 5B in a fluidically unlocked configuration.
Figure 7B:
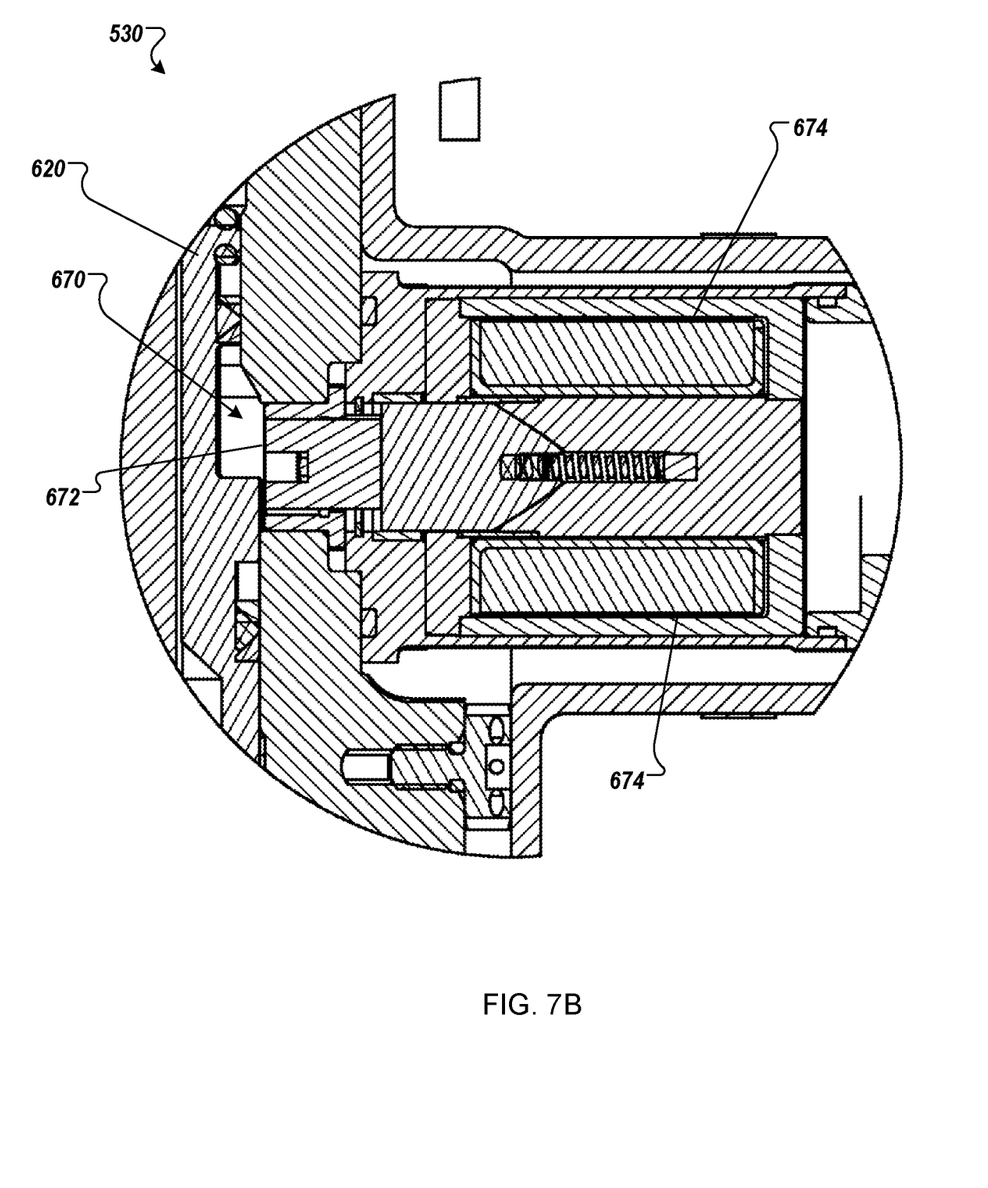

Referring to FIG. 7B, the lock pin 672 is shown in a retracted (e.g., unlocked) configuration. When the lock pin 672 is retracted from the lock recess 670, the piston head 638 is free to move to its unlocked configuration, as will be discussed in more detail in the descriptions of FIGS. 7A-9. In use, the electric lock assembly 530 can be controllably activated and deactivated to selectably permit and prohibit movement of the piston head 638.

FIGS. 7A and 7B are sectional views of the example thrust reverser synchronization shaft lock system 500 of FIGS. 5A and 5B in a fluidically unlocked configuration (e.g., unlocked by hydraulic pressure). The piston head 638 is configured to divide the chamber 636 into a first fluid chamber 650 defined by the tubular inner wall 634 and the first piston face 640, and a second fluid chamber 652 defined by the tubular inner wall 634 and the second piston face 642.

The first fluid chamber 650 is in fluid communication with the fluid port 520 (e.g., stow pressure). A tubular fluid conduit 654 is defined through the length of the piston rod 620, and is configured to fluidically connect the first fluid chamber 650 with the second fluid chamber 652. When stow pressure is provided at the fluid port 520, both the first fluid chamber 650 and the second fluid chamber 652 receive stow pressure. Although the tubular fluid conduit 654 is defined within the piston rod 620 in the illustrated example, in some embodiments the fluid conduit can have any appropriate form, such as a dedicated conduit formed through or within the housing 632 (e.g., a separate tube that connects the chambers 650 and 652) or a conduit defined between the piston rod 620 and the piston head 638.

The hydraulic lock assembly 630 is configured to urge the first piston rod end 622 out of the locked position (e.g., engagement with the radial prong 612, as shown in FIGS. 6A and 6B) and into an unlocked configuration (e.g., disengagement with the radial prong 612, as shown in FIGS.

7A and 7B) when the example thrust reverser synchronization shaft lock system 500 is subjected to stowage and/or deployment fluid pressures (e.g., during intentional stowage and/or deployment of the thrust reverser 400). The tubular inner wall 634 includes a first longitudinal outer wall portion 710 that is configured to define the first fluid chamber 650 to have a first lateral cross-sectional area (represented by arrow 712) proximal to the first piston rod end 622. The tubular inner wall 634 also includes a second longitudinal outer wall portion 720 configured to define the second fluid chamber 652 to have a second lateral cross-sectional area (represented by arrow 722) that is smaller than the first lateral cross-sectional area 712 distal from the first piston rod end 622.

The piston head 638 includes a first piston head portion 724 sized to contact the tubular inner wall 634 such that the first piston face 640 has substantially the first lateral cross-sectional area 712. The piston head 638 also includes a second piston head portion 726, sized to contact the tubular inner wall 634 such that the second piston face 642 has substantially the second lateral cross-sectional area 722. A variable-volume shaft fluid chamber 730 is defined by the chamber 638 between the first longitudinal outer wall portion 710 and the second piston head portion 726. The shaft fluid chamber 730 is configured to be in fluid communication with atmospheric gases at ambient pressure or with hydraulic return pressure to prevent accumulation of pressure or vacuum within the shaft fluid chamber 730 as the piston head 638 moves.

During a deploy operation, the electrical lock assembly 530 is activated to move the lock pin 672 to the retracted (e.g., unlocked) configuration shown in FIGS. 7A and 7B. When the lock pin 672 is retracted from the lock recess 670, the piston rod 620 is able to move away from the locked configuration. Stow pressure is then provided to the first fluid chamber 650, and in turn, the second fluid chamber 652 (e.g., through the tubular fluid conduit 654), such that the fluid pressures in the first fluid chamber 650 and the second fluid chamber 652 substantially equalize. However, due to the unequal sizes of the cross-sectional areas 712 and 722, the mechanical effects of the equal pressures acting upon the first piston face 640 and the second piston face 642 will be unequal. The resulting imbalance in hydraulic force will urge the piston head 638 to move radially away from the shaft 610.

As the piston head 638 moves away from the shaft 610, the second piston face 642 comes into contact with the stop 623 and causes the piston rod 620 to move radially away from the shaft 610 as well. The radially outward movement of the piston rod 620 urges the first piston rod end 622 to retract from interference with the radial prong 612, which unlocks the shaft 610.

During a deploy operation, the electrical lock assembly 530 is activated to move the lock pin 672 to the retracted (e.g., unlocked) configuration shown in FIGS. 7A and 7B. When the lock pin 672 is retracted from the lock recess 670, the piston rod 620 is able to move away from the locked configuration. Deploy pressure is applied through the synchronization system interface 510 to the first piston rod end 622. The deployment fluid pressure urges movement of the piston head 638 with a force that is sufficient to overcome the bias force of the bias members 662 and 663 and cause the first piston rod end 622 to move to the retracted configuration. In some embodiments, the stow and deploy pressures can be provided as part of a regenerative hydraulic system, in which fluid pressure can be present on the stow and deploy sides of actuators 431 (e.g., deploy pressure 495 and stow pressure 494 are equal) simultaneously. In such example systems, the stow pressure that is also present during a deploy operation can act upon the piston head 638 to also urge the piston rod 620 into the unlocked configuration.

Figure 8:
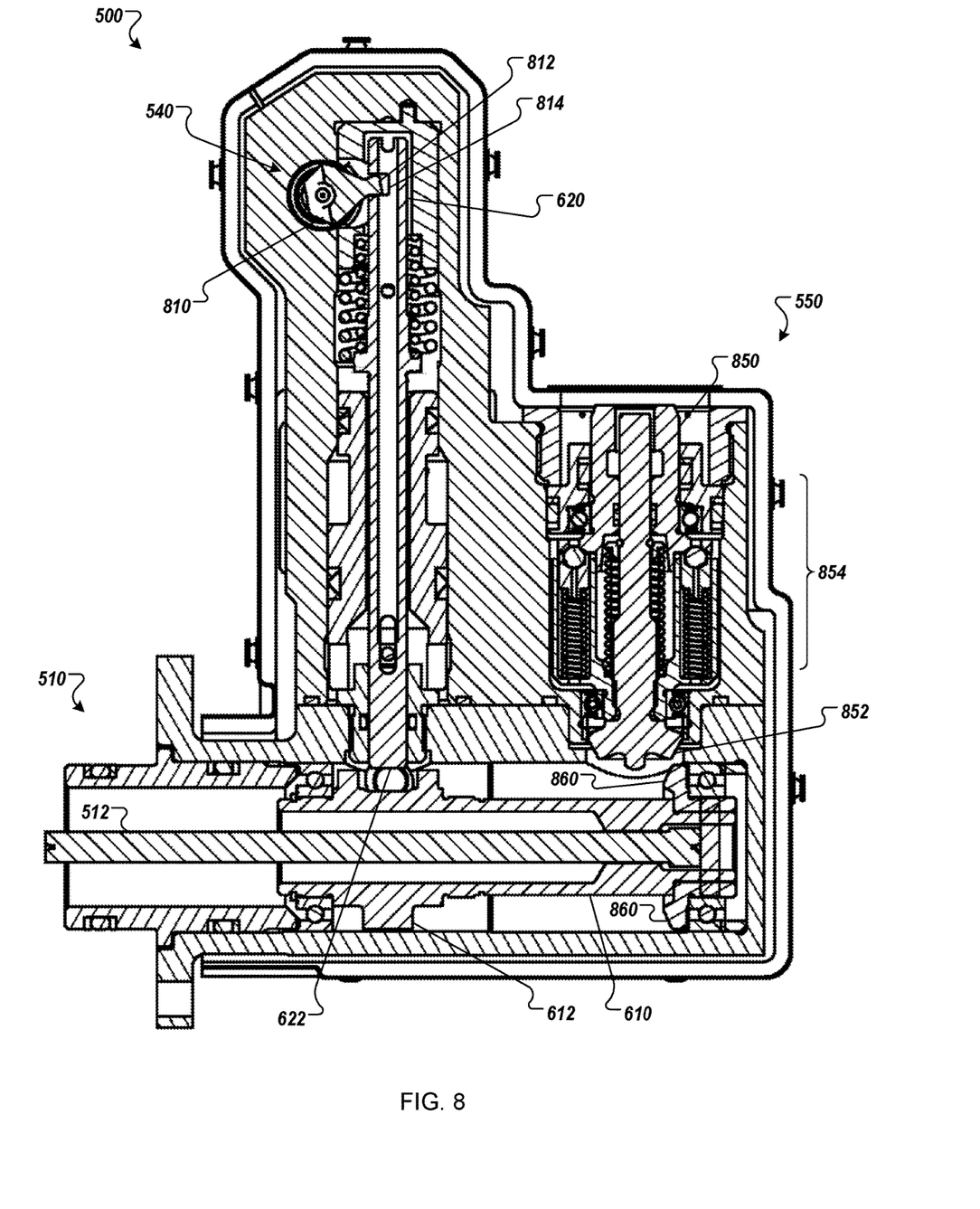
FIG. 8 is a sectional view of the example thrust reverser synchronization shaft lock system of FIGS. 5A and 5B in a manually unlocked configuration.

FIG. 8 is a sectional view of the example thrust reverser synchronization shaft lock system 500 of FIGS. 5A and 5B in a manually unlocked configuration. The thrust reverser synchronization shaft lock system 500 includes the manual unlock assembly 540 having the manual input 542 (not visible here, but shown in FIGS. 5A, 5B, and 6B). In some examples, the manual unlock assembly 540 can be used to put the example thrust reverser synchronization shaft lock system 500 into the unlocked configuration without electrical or hydraulic power (e.g., during ground maintenance of an aircraft).

The manual input 542, is coupled to a pivotable cam 810. The pivotable cam 810 includes a prong 812 that engages with a recess 814 formed in the piston rod 620.

In use, the manual input 542 is rotated (e.g., by an aircraft mechanic). As the manual input 542 is rotated (e.g., counterclockwise in the example view) the pivotable cam 810 and the prong 812 are rotated as well. Rotation of the prong 812, in engagement with the recess 814, urges movement of the piston rod 620 against the force of the bias member 660 and retracts the first piston rod end 622 away from interference with the radial prong 612. Since the piston rod 620 is not affixed to the piston head 638, the piston rod 620 can be retracted while the piston head 638 remains locked by the electrical lock assembly 530.

With the first piston rod end 622 in the unlocked configuration, the shaft 610 is free to turn. The manual drive assembly 550 is configured to couple the shaft 610 to a removable rotary power source of torque (e.g., a box wrench, a powered or manual rotary tool, such as a manual crank handle, a portable drill, or an air wrench) in order to actuate the actuators 430a-430b.

The manual drive assembly 550 includes a coupler 850 that is coupled to a gear head 852 by a clutch mechanism 854. When not in use, the clutch mechanism 854 urges the gear head 852 out of engagement with a collection of gear teeth 860 extending from the shaft 610, which decouples the manual drive assembly from the shaft 610. In use, a rotary tool is rotatably mated to the coupler 850, and longitudinal force is applied to the coupler 850 to urge the gear head 852 into engagement with the gear teeth 860. The coupler 850 can then be rotated to urge rotation of the shaft 610.

Figure 9:
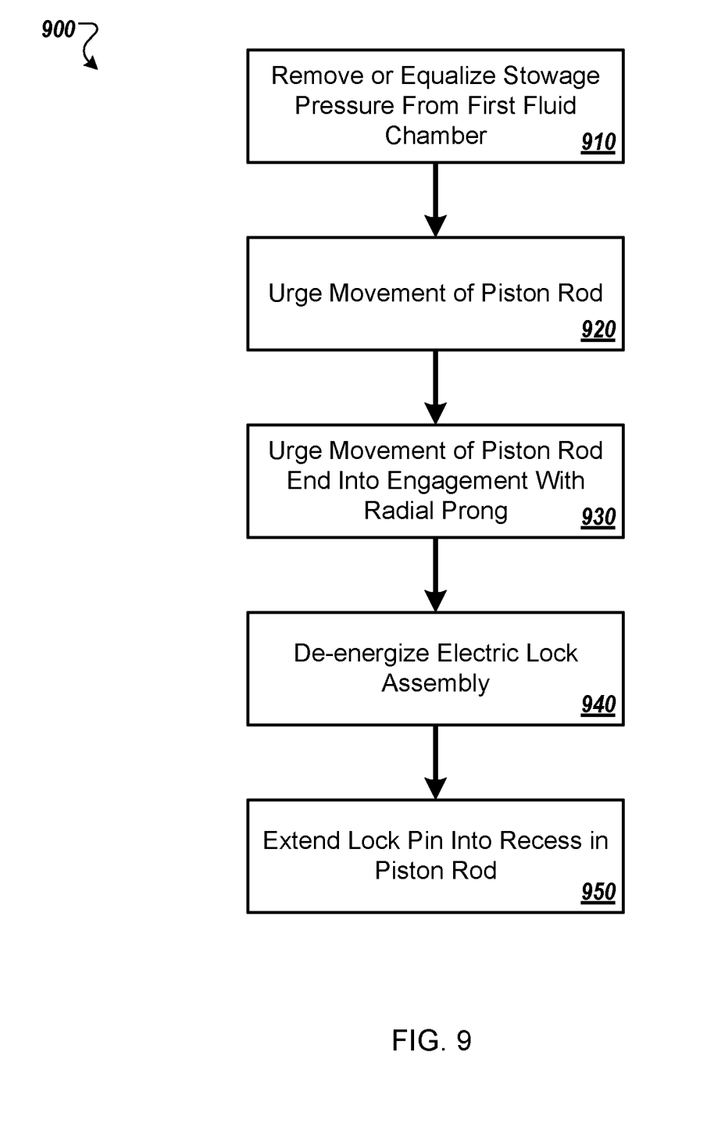
FIG. 9 is a flow diagram of an example process for locking the example thrust reverser synchronization shaft lock system of FIGS. 5A and 5B.

FIG. 9 is a flow diagram of an example process 900 for locking the example thrust reverser synchronization shaft lock system 500 of FIGS. 5A-8.

At 910, a hydraulic stowage fluid pressure in a first fluid chamber is removed or equalized (e.g., relative to atmospheric pressure), where a hydraulic lock assembly includes a housing, a piston head, a piston rod coupled to the piston head, the first fluid chamber in the housing at a first longitudinal end of the piston head, and a second fluid chamber in the housing at a second longitudinal end of the piston head opposite the first longitudinal end. For example the example thrust reverser synchronization shaft lock system 500 can be provided, and stow pressure can be removed or otherwise released from the first fluid chamber 650.

At 920, a bias member urges longitudinal movement of the piston rod in a first direction, the piston rod having a first piston rod end and a second piston rod end opposite the first piston rod end. For example, the bias member 660 can urge movement of the piston rod 620 toward the shaft 610.

At 930, longitudinal movement of the piston rod in the first direction urges the first piston rod end into engagement with a radial prong extending radially from a rotatable shaft. For example, the piston rod 620 can move to bring the first piston rod end 622 into a position that can cause engagement with the radial prong 612.

At 940, an electric lock assembly is de-energized. For example, the electric actuator 674 of the electric lock assembly 530 can be de-energized or otherwise deactivated.

At 950, a lock pin is extended into engagement with a recess defined in the piston head, based on the de-energizing an electric lock assembly. For example, when the electric actuator 674 of the electric lock assembly 530 is de-energized, the lock pin 672 is permitted to extend in to the lock recess 670.

In some implementations, the process 900 can also include prohibiting, by engagement of the lock pin with the recess, disengagement of the first piston rod end from the radial prong. For example, when the lock pin 672 is engaged with the lock recess 670, longitudinal movement of the piston rod 620 is substantially inhibited.

In some implementations, the process 900 can also include prohibiting, by engagement of the first piston rod end with the radial prong, rotation of the shaft. For example, when the piston rod 620 is in the locked configuration, the shaft 610 is prohibited from making more than about one rotation due to mechanical interference between the first piston rod end 622 and the radial prong 612.

In some implementations, the process 900 can include energizing the electric lock assembly, retracting, based on the energizing, the lock pin from engagement with the recess, applying the hydraulic stowage fluid pressure to the first fluid chamber, urging, by the hydraulic stowage fluid pressure in the first fluid chamber, longitudinal movement of the piston head in a second direction opposite the first direction, urging, by longitudinal movement of the piston head in the second direction, longitudinal movement of the piston rod in the second direction, and urging, by longitudinal movement of the piston rod in the second direction, the first piston rod end out of engagement with the radial prong. For example, the example thrust reverser synchronization shaft lock system 500 can be reconfigured from the locked configuration shown in FIGS. 6A-6C to the unlocked configuration shown in FIG. 7A-7B by energizing the electric lock assembly 530 to retract the lock pin 672 from the lock recess 670. Then stow pressure can be provided to the hydraulic lock assembly 630 to retract the piston rod 620 away from the shaft 610 and remove the first piston rod end 622 from engagement with the radial prong 612.

In some implementations, the process 900 can also include applying the hydraulic stowage fluid pressure to the second fluid chamber, where the first piston face has a first lateral cross-sectional area, applying a first hydraulic force, based on the first lateral cross-sectional area, to the piston head in the first direction, applying the hydraulic stowage fluid pressure to the first fluid chamber, wherein the second piston face has a second lateral cross-sectional area that is larger than the first lateral cross-sectional area, and applying a second hydraulic force, based on the second lateral cross-sectional area, to the piston head in the second direction, wherein the second lateral cross-sectional area is configured such that the second hydraulic force is greater than the first hydraulic force and a bias force of the bias member. For example, stow pressure can be applied to the first fluid chamber 650 and the second fluid chamber 652. The difference between the first lateral cross-sectional area 712 and the second lateral cross-sectional area 722 causes an imbalance between the hydraulic forces imposed by the first piston head portion 724 (e.g., a relatively greater force) and the second piston head portion 726 (e.g. a relatively lesser force).

In some implementations, removing a hydraulic stowage fluid pressure in a first fluid chamber can include removing the hydraulic stowage pressure from a first piston face on a first longitudinal side of the piston head, the first piston face defining the first fluid chamber in fluid communication with a thrust reverser stowage fluid pressure source of a jet engine thrust reverser system, removing the hydraulic stowage fluid pressure from a second piston face on a second longitudinal side of the piston head opposite the first piston face, the second piston face defining the second fluid chamber in fluid communication with the thrust reverser stowage fluid pressure source of the jet engine thrust reverser system. For example, the first fluid chamber 650 and the second fluid chamber 652 are fluidically connected, and when stowage pressure against the first piston face 640 is relieved, the corresponding stowage pressure against the second piston face 642 is also relieved.

In some implementation, the process 900 can also include urging rotation of a pivotable cam engaged with a cam recess defined in the piston rod, urging, based on the rotation, longitudinal movement of the piston rod in a second longitudinal direction opposite the first longitudinal direction, and disengaging, based on the longitudinal movement of the piston rod in the second longitudinal direction, the first piston rod end from the radial prong. For example, the manual unlock assembly 540 can be actuated to manually unlock the thrust reverser synchronization shaft lock system 500.

In some implementations, the process 900 can also include coupling a removable rotational power source to an input of a drive assembly, urging, by the removable rotational power source, rotation of the input, and urging, by the drive assembly, rotation of the shaft based on the rotation of the input. For example, the shaft 610 can be rotated by coupling a rotary tool to the manual drive assembly 550 and applying a torque.

Although a few implementations have been described in detail above, other modifications are possible. For example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A thrust reverser synchronization shaft lock system comprising:
   a rotatable shaft comprising at least one radial prong extending radially from the shaft;
   a hydraulic lock assembly comprising:
      a housing comprising a tubular inner wall defining a chamber;
      a piston head configured to contact the tubular inner wall and comprising a first piston face on a first longitudinal side of the piston head, a second piston face on a second longitudinal side of the piston head opposite the first piston face, and a lock recess, and configured to divide the chamber into a first fluid chamber defined by the tubular inner wall and the first piston face, and a second fluid chamber defined by the tubular inner wall and the second piston face;

a piston rod, having an axis not parallel to an axis of the shaft and extending radially away from the shaft from a first piston rod end to a second piston rod end opposite the first piston rod end, and configured to be urged by the piston head to move the first piston rod end out of engagement with the radial prong to selectably permit rotation of the shaft; and a bias member configured to urge the first piston rod end into engagement with the radial prong to selectably prohibit rotation of the shaft; and an electric lock assembly comprising:
a lock pin; and
an electric actuator configured to controllably extend and retract the lock pin in and out of engagement with the lock recess to selectably prohibit and permit movement of the piston rod.

2. The thrust reverser synchronization shaft lock system of claim 1, wherein:

the tubular inner wall comprises:
a first longitudinal wall portion configured to define the first fluid chamber to have a first lateral cross-sectional area proximal to the first piston rod end; and
a second longitudinal wall portion configured to define the second fluid chamber to have a second lateral cross-sectional area that is smaller than the first lateral cross-sectional area distal from the first piston rod end; and the piston head comprises:
a first piston head portion, sized to contact the tubular inner wall such that the first piston face has substantially the first lateral cross-sectional area; and
a second piston head portion, sized to contact the tubular inner wall such that the second piston face has substantially the second lateral cross-sectional area.

3. The thrust reverser synchronization shaft lock system of claim 2, further comprising a third fluid chamber configured to be in fluid communication with atmospheric gases at ambient pressure or with hydraulic return pressure, and defined by the first longitudinal wall portion and the second piston head portion.

4. The thrust reverser synchronization shaft lock system of claim 1, wherein the first fluid chamber is configured to be in fluid communication with a thrust reverser stowage fluid pressure source, and the second fluid chamber is configured to be in fluid communication with the thrust reverser stowage fluid pressure source.

5. The thrust reverser synchronization shaft lock system of claim 1, further comprising a shaft housing disposed about the shaft and defining a shaft fluid chamber configured to be in fluid communication with a thrust reverser deployment fluid source.

6. The thrust reverser synchronization shaft lock system of claim 5, further comprising a fluid conduit configured to fluidically connect the first fluid chamber and the second fluid chamber.

7. The thrust reverser synchronization shaft lock system of claim 6, wherein the fluid conduit is a tubular conduit defined through the piston rod.

8. The thrust reverser synchronization shaft lock system of claim 1, further comprising a pivotable cam configured to engage a cam recess defined in the piston head and pivot to urge longitudinal movement of the piston head and disengage the first piston rod end from the radial prong.

9. The thrust reverser synchronization shaft lock system of claim 1, further comprising a drive assembly configured to removably couple torque from a removable rotary power source to the shaft.

10. A method of thrust reverser synchronization shaft locking, comprising:

removing or equalizing a hydraulic stowage fluid pressure in a first fluid chamber, wherein a hydraulic lock assembly comprises a housing, a piston head, a piston rod coupled to the piston head, the first fluid chamber in the housing at a first longitudinal end of the piston head, and a second fluid chamber in the housing at a second longitudinal end of the piston head opposite the first longitudinal end;

urging, by a bias member, longitudinal movement of the piston rod in a first direction, the piston rod comprising a first piston rod end and a second piston rod end opposite the first piston rod end;

urging, by longitudinal movement of the piston rod in the first direction, the first piston rod end into engagement with a radial prong extending radially from a rotatable shaft;

de-energizing an electric lock assembly; and extending, based on the de-energizing an electric lock assembly, a lock pin into engagement with a recess defined in the piston head.

11. The method of claim 10, further comprising prohibiting, by engagement of the lock pin with the recess, disengagement of the first piston rod end from the radial prong.

12. The method of claim 10, further comprising prohibiting, by engagement of the first piston rod end with the radial prong, rotation of the shaft.

13. The method of claim 10, further comprising:
energizing the electric lock assembly;
retracting, based on the energizing, the lock pin from engagement with the recess;
applying the hydraulic stowage fluid pressure to the first fluid chamber; urging, by the hydraulic stowage fluid pressure in the first fluid chamber, longitudinal movement of the piston head in a second direction opposite the first direction;
urging, by longitudinal movement of the piston head in the second direction, longitudinal movement of the piston rod in the second direction; and
urging, by longitudinal movement of the piston rod in the second direction, the first piston rod end out of engagement with the radial prong.

14. The method of claim 13, further comprising:
applying the hydraulic stowage fluid pressure to the second fluid chamber, wherein a first piston face of the piston head has a first lateral cross-sectional area;
applying a first hydraulic force, based on the first lateral cross-sectional area, to the piston head in the first direction;
applying the hydraulic stowage fluid pressure to the first fluid chamber, wherein a second piston face of the piston head has a second lateral cross-sectional area that is larger than the first lateral cross-sectional area; and
applying a second hydraulic force, based on the second lateral cross-sectional area, to the piston head in the second direction, wherein the second lateral cross-sectional area is configured such that the second hydraulic force is greater than the first hydraulic force and a bias force of the bias member.

15. The method of claim 10, wherein removing or equalizing a hydraulic stowage fluid pressure in a first fluid chamber comprises:
- removing the hydraulic stowage fluid pressure from a first piston face on a first longitudinal side of the piston head, the first piston face defining the first fluid chamber in fluid communication with a thrust reverser stowage fluid pressure source of a jet engine thrust reverser system; and
- removing the hydraulic stowage fluid pressure from a second piston face on a second longitudinal side of the piston head opposite the first piston face, the second piston face defining the second fluid chamber in fluid communication with the thrust reverser stowage fluid pressure source of the jet engine thrust reverser system.

16. The method of claim 10, further comprising:
urging rotation of a pivotable cam engaged with a cam recess defined in the piston rod;
urging, based on the rotation, longitudinal movement of the piston rod in a second longitudinal direction opposite the first longitudinal direction; and
disengaging, based on the longitudinal movement of the piston rod in the second longitudinal direction, the first piston rod end from the radial prong.

17. The method of claim 16, further comprising:
coupling a removable rotational power source to an input of a drive assembly;
urging, by the removable rotational power source, rotation of the input; and
urging, by the drive assembly, rotation of the shaft based on the rotation of the input.

* * * * *